United States Patent

Miller et al.

Patent Number: 5,292,392
Date of Patent: Mar. 8, 1994

[54] METHOD OF MAKING FREE EDGE-SEALED FILM ARTICLES

[75] Inventors: Burdette W. Miller, Freeland; John O. McCree, Saginaw; William D. Price, Midland, all of Mich.

[73] Assignee: Dowbrands Inc., Indianapolis, Ind.

[21] Appl. No.: 994,605

[22] Filed: Dec. 21, 1992

Related U.S. Application Data

[63] Continuation of Ser. No. 513,537, Apr. 23, 1990, abandoned.

[51] Int. Cl.⁵ .............................................. B32B 31/20
[52] U.S. Cl. ............................... 156/308.4; 156/309.6; 156/499; 428/35.2
[58] Field of Search ............... 156/308.4, 304.6, 309.6, 156/499; 428/34.8, 34.9, 35.2, 35.4

[56] References Cited

U.S. PATENT DOCUMENTS

| Re. 31,269 | 6/1983 | Andrews et al. | 428/516 |
|---|---|---|---|
| 3,253,122 | 5/1966 | Kochmer et al. | 219/243 |
| 3,355,337 | 11/1967 | Zelnick | 156/499 X |
| 3,449,196 | 6/1969 | Morita et al. | 156/499 X |
| 3,508,378 | 4/1970 | Fehr et al. | 53/553 |
| 3,562,053 | 2/1971 | Lindley | 156/251 |
| 3,736,219 | 5/1973 | McTaggart | 428/192 |
| 3,827,472 | 8/1974 | Uramoto | 383/204 |
| 3,847,712 | 11/1974 | Hubbard | 156/515 |
| 3,912,575 | 10/1975 | Zelnick | 156/515 |
| 3,947,198 | 3/1976 | Hutt | 425/327 |
| 4,055,452 | 10/1977 | Carlisle | 156/251 |
| 4,117,193 | 9/1978 | Tsuchiya et al. | 428/339 |
| 4,201,609 | 5/1980 | Òlsén | 156/304.5 X |
| 4,356,221 | 10/1982 | Anthony et al. | 428/35.2 |
| 4,364,981 | 12/1982 | Horner et al. | 428/35.2 |
| 4,464,219 | 8/1984 | Colombo et al. | 156/251 |
| 4,464,426 | 8/1984 | Anthony | 428/35.2 |
| 4,488,924 | 12/1984 | Krieg | 156/251 |
| 4,502,906 | 3/1985 | Young et al. | 156/251 |
| 4,511,609 | 4/1985 | Craver et al. | 428/35.2 |
| 4,565,720 | 1/1986 | Yaeo et al. | 428/35.2 |
| 4,643,928 | 2/1987 | Kimura et al. | 428/35.2 |
| 4,687,532 | 8/1987 | Johnson | 156/251 |
| 4,988,465 | 1/1991 | Lustig et al. | 264/230 X |

FOREIGN PATENT DOCUMENTS 3736236  5/1989  Fed. Rep. of Germany.

OTHER PUBLICATIONS

Brydson, J. A., Flow Properties Of Polymer Melts, 2nd ed., George Godwins Ltd. 1981 pp. 96–97, 130, 131.
Graessley, Wm. W., Linear Viscoelasticity in Entangling Polymer Systems, The Journal of Chemical Physics, vol. 54, No. 12, Jun. 15, 1971.
Zehev, Tadmar, Principles Of Polymer Processing, Wiley & Sons, Inc. 1979, pp. 73–76.
Encyclopedia of Polymer Science and Engineeering, vol. 6, John Wiley & Sons; pp. 386–454.
William E. Young, "Sealing", The 1985 Packaging Encyclopedia, pp. 250–263.

*Primary Examiner*—Michael W. Ball
*Assistant Examiner*—Francis J. Lorin

[57] ABSTRACT

Free edge-sealed film articles and a method for making such, wherein the articles comprise a plurality of film portions and contain a free edge-seal between two of such portions, with one or both of the two free edge-sealed portions consisting essentially of a plurality of layers of diverse thermoplastic materials which are so ordered that on sealing the two portions together, the ordered layered film portion is curled toward the other of the two free edge-sealed portions.

7 Claims, 2 Drawing Sheets

METHOD OF MAKING FREE EDGE-SEALED FILM ARTICLES

CROSS-REFERENCE TO RELATED APPLICATION

This is a continuation of application Ser. No. 513,537, filed Apr. 23, 1990 abandoned.

FIELD OF THE INVENTION

The present invention relates to that class of film articles which will for present purposes be termed the "free edge-sealed" film articles and to methods for making such articles, and more particularly, to such articles comprising film portions which consist essentially of a plurality of layers of diverse thermoplastic materials.

Many film articles are currently made by processes involving the application of heat, solvents or the like to adjacent film portions to effect a seal therebetween, wherein at the point of application or at the location where a seal is effected, the adjacent film portions are fundamentally unsupported and thus possess some freedom of movement to respond to the application of such heat. Manufacturing processes which can be characterized in this fashion are described, for example, in U.S. Pat. No. 3,508,378 to Fehr et al., U.S. Pat. No. 3,736,219 to McTaggart, U.S. Pat. No. 3,947,198 to Hutt, U.S. Pat. No. 4,055,452 to Carlisle, and U.S. Pat. No. 4,502,906 to Young et al. Each of these processes involve the application of some film-sealing medium or means across a gap between two film plies, wherein the film plies are not pinched or pressed between a pair of heated surfaces in sealing the plies together but in a sense are sealed between two "free" edges or portions of the plies.

The "free edge-sealed" articles to which the present invention relates will, then, be understood to encompass the broad spectrum of film articles made by the processes characterized according to the preceding paragraph.

Among the many film articles which may be described as "free edge-sealed" are the majority of reclosable plastic storage bags. In the context of such reclosable plastic storage bags, it has been appreciated that bags having sides, bottoms and constituent film portions generally which consist essentially of a plurality of layers of diverse thermoplastic materials can have better structural and/or barrier properties than bags made from a blend of such materials or from a single material only. These improved properties, for example, improved puncture and/or barrier resistance, are highly desirable in the consumer's eyes.

In previous constructions of free edge-sealed film articles such as these reclosable plastic bags wherein diverse thermoplastic materials have been used, the materials have been used in a single blend layer or in a layer structure within a layered film portion which is balanced in terms of the moduli of the layers in the structure. These articles have been constructed in the manner indicated at least in part because of concerns over the curling at room temperature of plural layer films of the various diverse materials.

Each of the film portions in the single blend layer and balanced layer constructions handles and seals essentially in the fashion of a layer of a single material, with the seal strength of a seal between adjacent film portions being dependent generally on the same factors known to be implicated in determining the seal strength of free edge-sealed film portions comprised of a single material. These factors include whether the film portions to be joined are properly clamped, the gauge of the film portions to be joined, and the tension placed on the film portions.

Manufacturers of free edge-sealed film articles have because of these factors experienced significant difficulties in the past in achieving consistent seals, and these poor or inconsistent seals can limit the improvement in barrier or structural properties which can be achieved by the use of diverse and perhaps more costly materials, in addition to reducing the appeal of the articles to consumers.

It would be desirable, then, if free edge-sealed articles could be made wherein an improvement in properties realized by a combination of diverse materials in the articles and the consumer appeal of such a combination were not limited or even overcome by the formation of weak or incomplete seals between film portions in a significant number of the articles.

SUMMARY OF THE INVENTION

The present invention fulfills this desire by providing a free edge-sealed film article which is comprised in general terms of a plurality of film portions and which contains a free edge-seal between two of the plurality of film portions. At least one of the two free edge-sealed film portions consists essentially of a plurality of layers of diverse thermoplastic materials and is curled toward the other of the two film portions along at least a portion of the free-edge seal in free-edge sealing the film portions together.

Thus, it may be that only one of a respective pair of free edge-sealed film portions is layered, with the other film portion being comprised of a single layer only and only the one layered film portion curling toward the single layer portion on sealing the two portions together. Or, both of the two free edge-sealed film portions may be layered, but with one of the two film portions having a balanced structure such that again only one of the two layered film portions is curled toward the other. Or, both of the two film portions may be layered, and the layers within each ordered so that on sealing the two film portions together both film portions are curled toward the other.

The curling of a given film portion toward a second film portion during the free edge-sealing of such film portions enables the formation of a superior seal between the two film portions on a more consistent basis, as particularly evidenced by a lesser likelihood of leaks in certain reclosable plastic containers constructed in accordance with the present invention.

DETAILED DESCRIPTION OF THE PREFERRED EMBODIMENTS

Figure 5:
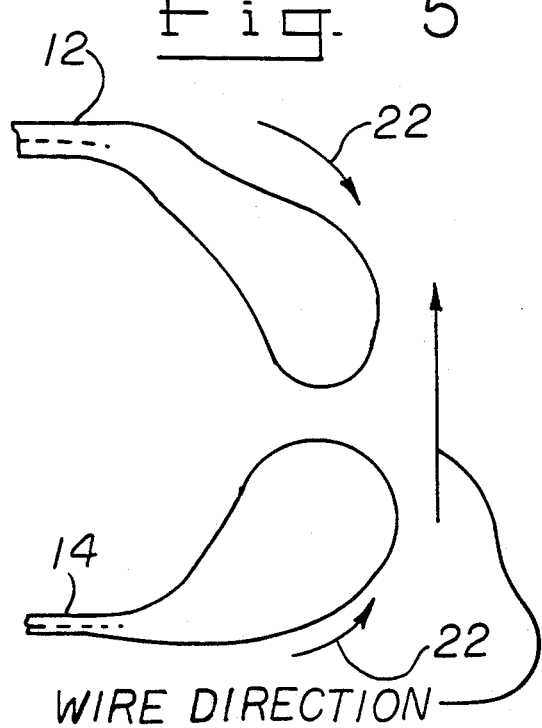
FIG. 5 is an enlarged fragmentary cross-sectional view of the formation of the seal between two layered film portions constructed and stacked as in FIGS. 1 and 2, and sealed in the same fashion as the stacked single layer film portions in FIG. 4.
Figure 6:
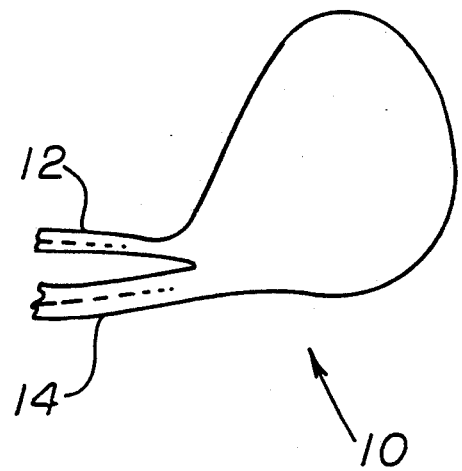
FIG. 6 is an enlarged fragmentary cross-sectional view of a completed free-edge seal between the two layered film portions in FIG. 5.

Referring now to the drawings, and more particularly to FIG. 6, a preferred construction of the free edge-sealed film articles of the present invention is depicted and denoted by the numeral 10. In this preferred construction, the film article is comprised of a plurality of film portions, with two of these film portions being the film portions 12 and 14 variously shown in FIGS. 1, 2, 5 and 6.

Figure 1:
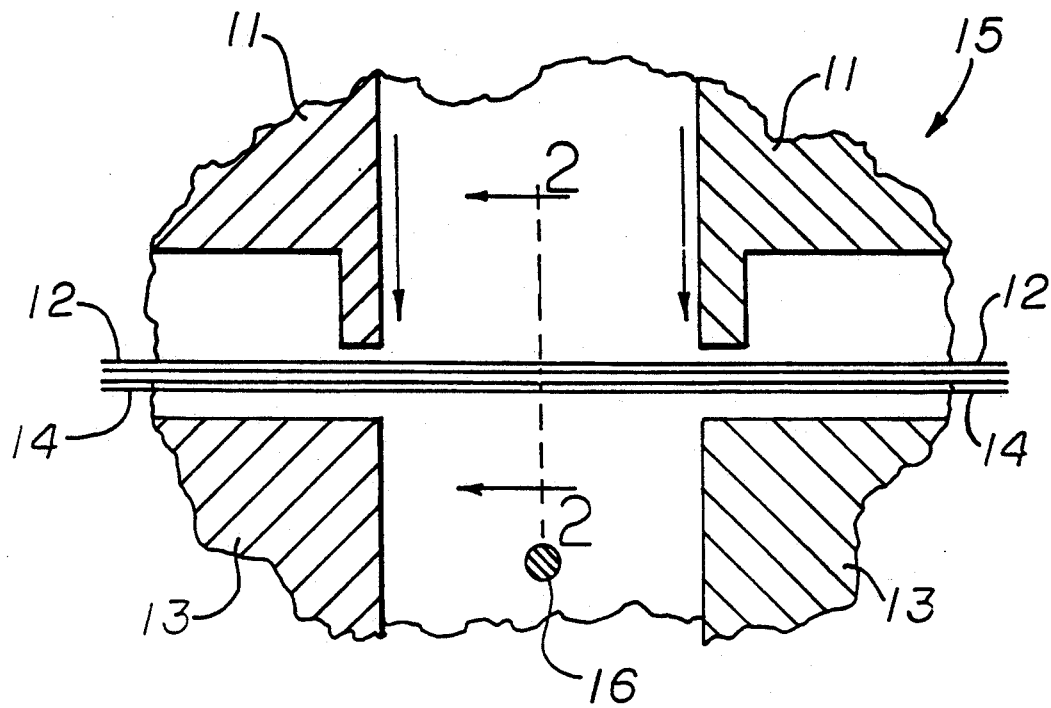
FIG. 1 is a fragmentary cross-sectional view of apparatus for free edge-sealing two layered film portions together.

Referring now to FIG. 1, the film portions 12 and 14 are shown being clamped by opposing elements 11 and 13 in position to be sealed together in a free edge-sealing apparatus 15, the free edge seal to be formed approximately along the line 2—2 by free edge sealing means such as a hot wire 16. As has been previously noted and as is well known in the art, a gap 17 is often formed between the film portions 12 and 14 in a clamped condition which must be bridged in order to obtain an effective seal between the film portions 12 and 14. This gap 17 and the preferred construction of the layered film portions 12 and 14 are evident in FIG. 2.

Figure 2:
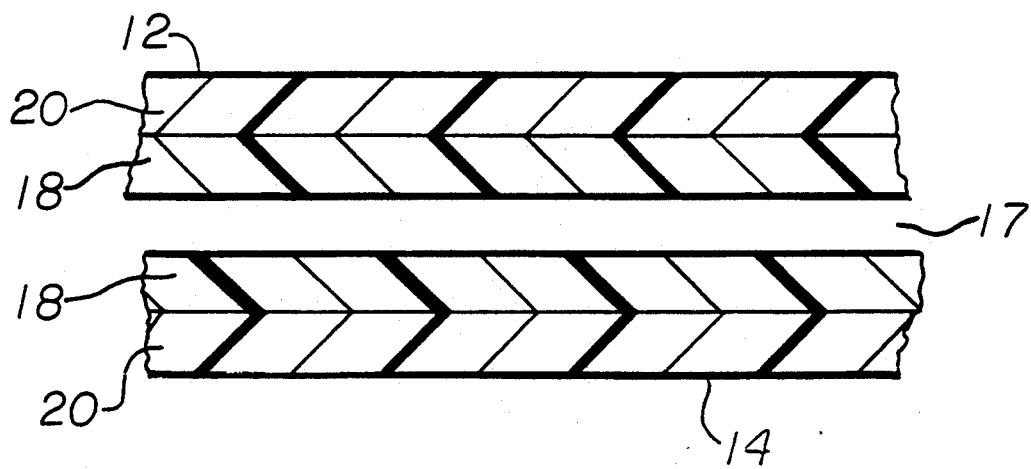
FIG. 2, taken along line 2—2 of FIG. 1, is an enlarged fragmentary cross-sectional view of the two layered film portions to be free edge-sealed together.

In the preferred construction of the film portions 12 and 14 shown in FIG. 2, the film portions 12 and 14 are substantially identically constructed of layers 18 and 20 of two diverse thermoplastic materials. The "diverse thermoplastic materials" are defined for purposes of the present invention as those materials which are characterized by differing amounts of frozen-in stress or differing melt properties generally, whereby on melting in the presence of the hot wire 16 the layers 18 and 20 retract at faster and slower rates, respectively, from the hot wire 16.

The "frozen-in stress" mentioned above can be considered a residual level of stress contained in layers 18 and 20, primarily as a function of the character of the materials comprising those layers. For example, the extrusion and drawing down in a conventional film manufacturing process of low density polyethylene(LDPE) can be seen to produce a level of residual or frozen-in stress in the resulting film layer due to the long side chains (comprising fifty or more carbon atoms) in the LDPE being bent and stretched alongside the backbone of the LDPE molecules. By the same token, the extrusion of linear low density polyethylene(LLDPE) (with side chains of fifteen and fewer carbons, generally) can be seen to result in comparatively lower amounts of frozen-in stress in the resulting film layer.

The stresses involved are "frozen-in" in the sense that the materials in layers 18 and 20 are at least temporarily fixed in a different spatial configuration than the lowest potential energy configuration to which they would naturally be inclined in a molten state.

With a proper selection of materials and of a thickness for each of the layers 18 and 20 formed from these materials, it can be seen that the differing rates of retraction experienced by layers 18 and 20 on free edge sealing can create a net bending moment in film portions 12 and 14, so that the ends of the film portions 12 and 14 are curled toward one another in forming a seal in the manner shown in FIGS. 5 and 6 and described below. This tendency to curl toward one another on sealing, it will be appreciated, will be advantageous in bridging the gaps 17 which might be formed between layered film portions 12 and 14 when clamped together in the sort of free edge sealing apparatus 15 depicted in FIG. 1.

A free edge-sealed reclosable plastic storage bag having substantially identically constructed film portions 12 and 14 consisting essentially of a low density polyethylene layer 18 and a linear low density polyethylene layer 20, for example, demonstrates a tendency for the two film portions 12 and 14 to curl together where the linear low density polyethylene selected has a density of from about 0.912 to about 0.941 grams per cubic centimeter and where the linear low density polyethylene layer 20 comprises on the average about 30 to about 70 percent of the thickness of film portions 12 and 14.

In contrast is the behavior of film portions 12a and 14a which are constructed from a homogeneous blend of materials, from a single material, or as a balanced set of layers of diverse materials when sealed in the manner suggested by FIG. 1. As can be seen from FIGS. 3 and 4, film portions 12a an 14a in a conventional free-edge sealing method retract from a wire 16 uniformly and without curling, while showing however a slight inclination in the direction of movement of the wire 16.

The free-edge seal between such portions 12a and 14a in a conventional free-edge sealing method results from the portions 12a and 14a being clamped closely enough, given the size of the beads formed in portions 12a and 14a, for the beads to run into one another or abut. Thus, the formation of an acceptable seal between film portions 12a and 14a which, in a conventional free-edge sealing method, are comprised of a blend of materials, a single material, or a balanced set of layers of various materials is dependent as mentioned previously on such factors as whether the film portions to be joined are properly clamped, the gauge of the film portions to be joined, and the tension placed on the film portions.

On the other hand, as may be seen with particular reference to FIG. 5, when the layered film portions are properly constructed and arranged in accordance with the present invention, the beads formed by the layered film portions are predisposed to form a seal with a respective film portion by expanding or curling in the direction of arrows 22 toward that film portion during the free-edge sealing process.

As has been suggested previously, while a preferred embodiment of the free edge-sealed articles of the present invention is as described above, a number of other embodiments are possible and may be employed if desired. For example, the film portions 12 and 14 can individually contain or can each contain any number of layers of any number of diverse thermoplastic materials, so long as on sealing the two film portions 12 and 14 together the cumulative effect of the layers within at least one of the two film portions 12 and 14 is the curling toward the other of the two film portions 12 and 14 along at least a portion of the free-edge seal formed between film portions 12 and 14.

It will also be appreciated that a free edge-sealed film article constructed in accordance with the teachings of the present invention may be comprised of a number also of other layered film portions to be free edge-sealed to a single layer film portion, or to a different layered film portion of the same or a different construction.

It may be desirable for still other applications to create a localized zone of weakness in the seal between two film portions, at least one of which is layered in such a fashion that on free edge-sealing the two film portions together the layered film portion is curled toward the other film portion along at least a portion of the sealed area. A localized zone of weakness in a different portion of the seal can be achieved for example by altering the relative thicknesses of layers within a layered film portion so that it curls away from, rather than toward, the other film portion to which it is being sealed. In another embodiment, seals between film portions may be made of different strengths, so that for instance a completely sealed plastic film container is preferentially ruptured along certain seals.

Considering, however, more conventional and presently commercially significant uses of free edge-sealed film articles, it will normally be desirable to employ the teachings of the present invention to form uniformly stronger seals (in the sense of requiring a greater energy to break the seals) between free edge-sealed film portions. For example, a most preferred embodiment of the articles of the present invention will be as reclosable plastic containers of the type having two flexible opposed free edge-sealed sidewalls and an interlocking closure mechanism which is operable for being interlocked over a predetermined length and which is connected to the two sidewalls adjacent an open end of the container.

More particularly, the most preferred reclosable plastic containers of the present invention will be characterized by two opposed flexible sidewalls free edge-sealed along at least two edges, and an interlocking closure mechanism comprising a pair of opposed interlocking rib- and groove-type closure members which may be interlocked to substantially effect a sealing closure of the adjacent open end of the container.

The opposed flexible sidewalls are preferably substantially identically constructed with each being from about 1 to about 4 mils in thickness and consisting essentially of an inner layer 18, relative to the interior of the bag, of low density polyethylene, and an outer layer 20 of a linear low density polyethylene having a density of from about 0.917 to about 0.935 grams per cubic centimeter. The outer LLDPE layer, further, should preferably comprise from about 35 to about 65 percent, and most preferably about 45 to about 55 percent of the thickness of a respective sidewall on the average.

The most preferred reclosable plastic containers should preferably have at least one and most preferably both of the sidewalls curl toward the other sidewall on sealing the same together, such that the reclosable plastic containers so constructed leak to a significantly lesser extent when blown up in the manner of a balloon and submersed underwater than reclosable containers which are substantially identically constructed, blown up and submersed but which comprise sidewalls consisting essentially of the same diverse materials in a substantially homogeneous blend. As a measure of this improved sealing made possible by the present invention, the reclosable plastic containers of the present invention should preferably have less than about 20 percent of the leaks, and most preferably less than about 10 percent of the leaks seen in the same container but with blended rather than layered sidewalls.

A preferred method of making a free edge-sealed film article such as described herein would involve coextruding layers of diverse thermoplastic materials in a continuous film web, while ordering and dimensioning the layers according to differing levels of frozen-in stress, for example, to create a tendency to curl in the assembled layers in a free edge-sealing process. A first portion from the film web could then in one embodiment be inverted in stacked relationship to a second, preferably substantially identically constructed portion of the same or a different film web as shown in FIG. 1, and sealed thereto. In a most preferred method of making the free edge-sealed film articles of the present invention, the layered first and second portions would comprise adjacent portions of the same continuous film web, and the inverting and stacking of the first portion with respect to the second would be accomplished simply by folding the film web intermediate the first and second portions.

ILLUSTRATIVE EXAMPLES

The following examples are offered to illustrate the present invention only, and should not be taken to in any way limit the scope of the invention as defined by the claims which follow.

EXAMPLE 1

Figure 3:
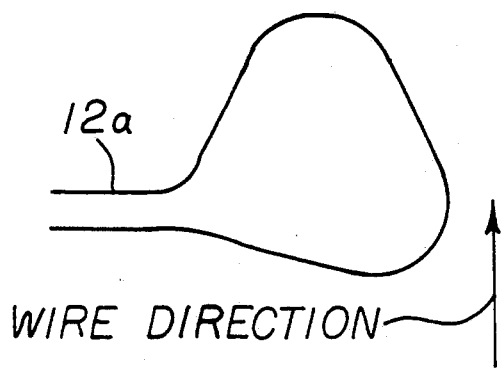
FIG. 3 is an enlarged fragmentary cross-sectional view of a typical bead formed by a single layer film portion of substantially uniform composition on contact with a hot sealing wire in a conventional free edge sealing method.

In this example, single layer film portions of an average thickness of about 1.7 mils were produced by blending 50 percent by weight of a low density polyethylene and 50 percent by weight of a linear low density polyethylene having a density of about 0.935 grams per cubic centimeter, and extruding the substantially homogeneous blend in a conventional cast film process to a chill roll. These single layer film portions were observed microscopically to form a generally triangularly-shaped bead such as shown in FIG. 3 when exposed to a hot sealing wire. The slight upward tilt of the bead again typically reflects the direction of movement of the hot wire in a hot wire, free edge-sealing apparatus relative to the film portion. The single layer film portions when clamped and wire-sealed together on a manually controlled wire sealer produced a seal having the general appearance of two triangles joined along a side, such as shown in FIG. 4.

For comparison, layered film portions having discrete layers 18 and 20 formed from the same LDPE and LLDPE, respectively, were made by coextruding the LDPE and LLDPE layers 18 and 20 to a chill roll in the same cast film process as employed with the single blend layer. The LLDPE layer 20 comprised about 50 percent of the thickness of the coextruded film, on the average.

When the LDPE layer 18 of a given layered film portion was placed in a position to be exposed to the same hot sealing wire after the LLDPE layer, an upward curving, generally oval-shaped edge bead was formed. Where the LDPE layer 18 was placed in a position to be exposed to the wire first, the edge bead still curved downward, even despite the inherent tendency of an edge bead to curve somewhat in the direction of movement of the hot sealing wire generally.

Figure 4:
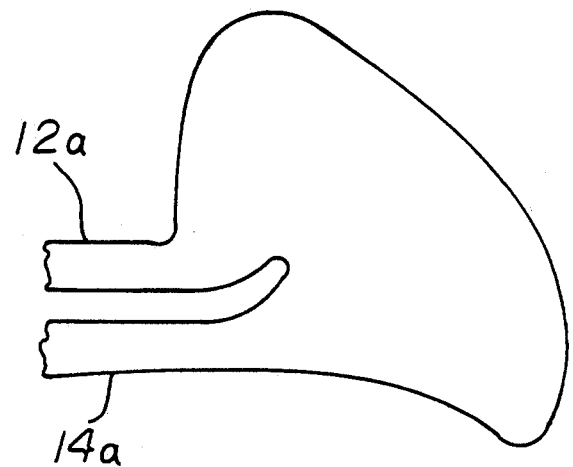
FIG. 4 is an enlarged fragmentary cross-sectional view of a conventional hot wire, free edge seal between two single layer film portions of the type shown in FIG. 3.

A comparison of the seal shown in FIG. 4 and an enlarged cross-sectional view (FIG. 6) of the seal between two film portions 12 and 14 with layers 18 and 20 of LDPE and LLDPE arranged as in FIGS. 1 and 2 suggests that the edge beads formed in the layered film portions of the present invention cooperatively "knit"

together rather than merely abutting one another as in the known art. The integrity of the seal in the free edge-sealed articles of the present invention are as a result believed to be less dependent on such factors as whether the film portions to be sealed are properly clamped or not, so that adequate seals should be more consistently and reliably achieved.

It should be noted that thinner gauge layered film portions were as a rule observed to curl even more strongly in a given direction than thicker gauge films. Whereas thinner gauge films of a conventional construction would form smaller beads, and thus would presumably be given to greater sensitivity to clamping defects and like difficulties, the comparative benefit provided in terms of sealing by a layered and ordered film portion as described herein should be even more pronounced for films of an average thickness of about 2.0 mils or less.

EXAMPLE 2

For this example, a number of sets of reclosable plastic storage containers of the type having two opposed flexible sidewalls of an average thickness of about 2.0 mils, and a pair of opposed rib- and groove-type closure members were constructed by standard commercial methods and equipment.

The sidewalls of a container in a particular set were substantially identically constructed to one another, and to sidewalls of the other containers in a set, by extruding or coextruding in a cast film process a low density polyethylene and/or a linear low density polyethylene having a density of about 0.935 grams per cubic centimeter in various combinations. The resulting films were: 100% low density polyethylene (set "A"); a blend of 70% by weight of low density polyethylene and 30% by weight of the LLDPE (set"B"); a coextruded film with a LDPE layer comprising 70% of the film thickness and with a LLDPE layer comprising the remaining 30% of the film thickness (set"C"); a coextruded film having a LDPE layer and a LLDPE layer which each comprised 50% of the thickness of the coextruded film (set "D"); a coextruded film having a LDPE layer comprising 30% of the film thickness and a LLDPE layer comprising the other 70% of the film thickness on average (set"E"); and 100% of the LLDPE (set"F").

Rib- and groove-type closure members were conventionally applied to the LDPE side of these films, if any, and the films folded over one another for wire sealing on a manually controlled wire sealer with the LDPE layers facing inwardly. One hundred containers were formed for each set by identically sealing the sidewalls together from the area of the fold completely through the closure members, so that the containers could thereafter be blown up, immersed and tested for leaks along the wire seals in the various sets of containers.

To accentuate any differences between the various sets, several things were purposely done which are conventionally known to cause leaks along the wire seals of such containers. For example, the closure members were oriented upside down with respect to the notch placed in the hold-down bar to accommodate the closure members.

The completed containers were then blown up, the closure members were engaged to seal off the respective open ends of the containers, and the containers immersed underwater. The containers for each set were observed for signs of leaks along the wire-sealed right and left side welds, in the right and left bottom corners, and adjacent the closure members at the right and left sides of the containers.

Table 1 reports the number of leaks observed in the hundred containers of each set that were formed and tested, the location of the observed leaks, and the distribution of the leaks among the hundred containers within the set.

TABLE I

| Location | Set A | Set B | Set C | Set D | Set E | Set F |
|---|---|---|---|---|---|---|
| Left Bottom Corner | 84 | 76 | 1 | 5 | 0 | 93 |
| Right Bottom Corner | 98 | 99 | 9 | 0 | 0 | 100 |
| Sum, Bottom Corners | 182 | 175 | 10 | 5 | 0 | 193 |
| Left Side Weld | 18 | 20 | 1 | 3 | 20 | 49 |
| Right Side Weld | 12 | 10 | 0 | 0 | 44 | 40 |
| Sum, Side Welds | 30 | 30 | 1 | 3 | 64 | 89 |
| Left Closure Member | 52 | 35 | 0 | 1 | 1 | 50 |
| Right Closure Member | 79 | 67 | 1 | 2 | 2 | 46 |
| Sum, Closure Members | 131 | 102 | 1 | 3 | 3 | 96 |
| Sum, All leaks | 343 | 307 | 12 | 11 | 67 | 378 |
| Percent of Containers of Set Leaking | 100 | 100 | 12 | 11 | 60 | 100 |

Sets B and C from Table 1 particularly suggest that the reclosable plastic containers employing layered sidewalls which curl toward one another in the process of being free-edge sealed (as in Set C) are substantially less likely to leak along the wire seals thereof, than containers conventionally made from the same materials in a substantially homogeneous blend (Set B).

It should be noted that the success of the present invention is not dependent on, nor does the present invention necessarily adversely affect, the room temperature curling properties and machinability of those layered film portions of which the free edge-sealed articles of the present invention are to be comprised. In fact, some films having a lesser tendency to curl at room temperature have been found to curl to a greater extent in a free edge-sealing process, and to form better seals when stacked and arranged in accordance with the present invention, than other films which curl to a larger extent at room temperature.

While preferred embodiments of the free edge-sealed articles of the present invention and of a method for making such articles have been described and exemplified herein, it will be appreciated that numerous changes can be made thereto without departing in scope or spirit from the invention disclosed herein and defined by the appended claims.

What is claimed is:

1. A method of making film articles having two film portions free edge-sealed together using a hot sealing wire wherein at least one of the two free edged-sealed film portions consists essentially of a plurality of layers of diverse thermoplastic materials, comprising the steps of:

ordering the plurality of layers of diverse thermoplastic materials within a respective layered film portion such that on free-edge sealing the film portions together using a hot sealing wire, the ordered layered film portion is curled toward the other of the two film portions along at least a portion of the free-edge seal;

clamping the two film portions approximately parallel to each other and closely enough together such that when curling occurs during free-edge sealing with a hot sealing wire the ordered layered film portion runs into or abuts the other of the two film portions, bridging the gap between the two film portions, and forming a seal with the other of the two film portions; and hot-wire sealing the film portions together along at least a portion of the free-edge seal.

2. A method as defined in claim 1, wherein:

each of the two free edge-sealed film portions consists essentially of a plurality of layers of diverse thermoplastic materials; and the plurality prior to the clamping and hot-wire sealing steps, of layers are ordered within each of the two free edge-sealed film portions such that each of the two layered film portions is curled toward the other of the two layered film portions.

3. A method of making film articles as defined in claim 2, wherein:

the two layered film portions are substantially identically constructed; and the step of ordering the plurality of layers of diverse thermoplastic materials within each of the two layered film portions comprises the steps of:

inverting one of the two layered film portions with respect to the other; and placing the inverted layered film portion in stacked relation with the other layered film portion.

4. A method as defined in claim 3, wherein:

the two layered film portions initially comprise adjacent portions of a continuous planar film web; and the steps of inverting one layered film portion and placing the inverted layered film portion in stacked relation with the other layered film portion comprise folding the continuous planar film web intermediate the adjacent layered film portions.

5. A method as defined in claim 4, wherein the step of ordering the plurality of layers of diverse thermoplastic materials within each of the two layered film portions comprises coextruding the diverse thermoplastic materials in a coextrusion feedblock to form the continuous planar film web.

6. A method of making film articles as defined in claim 1, wherein the plurality of layers of diverse thermoplastic materials within the ordered layered film portion are ordered according to the rate at which each layer retracts away from a hot sealing wire when the layers are melted in the presence of a hot sealing wire during free-edge sealing.

7. A method of making film articles as defined in claim 6, wherein the rate of reaction of the plurality of layers of diverse thermoplastic materials within the ordered layered film portion is based on a level of frozen-in stress produced by the extrusion and drawing down of the thermoplastic material and possessed by the ordered plurality of layers before the two film portions are free edge-sealed together.

* * * * *

UNITED STATES PATENT AND TRADEMARK OFFICE
CERTIFICATE OF CORRECTION

PATENT NO. : 5,292,392

DATED : March 8, 1994

INVENTOR(S) : Burdette W. Miller, John O. McCree, William D. Price

It is certified that error appears in the above-identified patent and that said Letters Patent is hereby corrected as shown below:

Col. 9, line 15, move "prior to the clamping and hot wire sealing steps," before the word "the".

Col. 10, line 23, "reaction" should read -- retraction --.

Signed and Sealed this

Eleventh Day of October, 1994

Attest:

BRUCE LEHMAN

Attesting Officer

Commissioner of Patents and Trademarks